United States Patent
Olson et al.

(10) Patent No.: US 9,721,603 B2
(45) Date of Patent: Aug. 1, 2017

(54) HEAD-MEDIUM CONTACT DETECTION USING AN OSCILLATING ELECTROMAGNETIC FORCE

(71) Applicant: Seagate Technology LLC, Cupertino, CA (US)

(72) Inventors: Daniel W. Olson, St. Louis Park, MN (US); Declan Macken, Eden Prairie, MN (US); Andrea L. Geer, Shoreview, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/237,878

(22) Filed: Aug. 16, 2016

(65) Prior Publication Data

US 2017/0092313 A1    Mar. 30, 2017

Related U.S. Application Data

(60) Provisional application No. 62/232,650, filed on Sep. 25, 2015.

(51) Int. Cl.
*G11B 5/60* (2006.01)

(52) U.S. Cl.
CPC ........... *G11B 5/6011* (2013.01); *G11B 5/607* (2013.01); *G11B 5/6035* (2013.01); *G11B 5/6076* (2013.01)

(58) Field of Classification Search
CPC .......... G11B 5/02; G11B 5/60–5/6017; G11B 5/6035; G11B 5/607–5/6076; G11B 5/6094

USPC ............................ 360/31, 53, 55, 60, 69, 75
See application file for complete search history.

(56) References Cited

U.S. PATENT DOCUMENTS

| | | | |
|---|---|---|---|
| 3,789,234 A | 1/1974 | Watanabe et al. | |
| 4,005,358 A | 1/1977 | Foner | |
| 5,365,787 A | 11/1994 | Hernandez et al. | |
| 7,016,139 B2 | 3/2006 | Baumgart et al. | |
| 7,233,451 B2 | 6/2007 | Baumgart et al. | |
| 7,405,896 B2 | 7/2008 | Hirano et al. | |
| 7,573,668 B2 | 8/2009 | Kwon et al. | |
| 7,660,068 B1 | 2/2010 | Baumgart et al. | |
| 7,719,786 B1 * | 5/2010 | Baumgart | G11B 5/6005 360/75 |
| 7,729,079 B1 * | 6/2010 | Huber | G11B 5/6005 360/75 |
| 7,830,634 B2 * | 11/2010 | Chen | G11B 27/36 360/75 |

(Continued)

*Primary Examiner* — Wayne Young
*Assistant Examiner* — James L Habermehl
(74) *Attorney, Agent, or Firm* — Hollingsworth Davis, LLC (57) ABSTRACT

An apparatus comprises circuitry configured to apply an AC signal having a frequency to one of a slider of a recording head and a magnetic recording medium. The applied AC signal causes an oscillation in an electrostatic force and clearance between the slider and the medium at the frequency of the AC signal. A thermal sensor is configured to generate a sensor signal at the AC signal frequency in response to sensing changes in temperature resulting from the oscillating clearance. A detector is coupled to the circuitry and the thermal sensor. The detector is configured to detect one or both of head-medium spacing changes and head-medium contact using a phase of a first harmonic or an amplitude of a second harmonic of the thermal sensor signal.

17 Claims, 9 Drawing Sheets

(56) References Cited

U.S. PATENT DOCUMENTS

| | | | |
|---|---|---|---|
| 8,049,984 B2 | 11/2011 | Contreras et al. | |
| 8,085,490 B2* | 12/2011 | Franca-Neto | G11B 5/6029 360/75 |
| 8,102,181 B2 | 1/2012 | Redko et al. | |
| 8,630,057 B2 | 1/2014 | Murthy et al. | |
| 8,699,173 B1* | 4/2014 | Kang | G11B 5/6076 360/75 |
| 8,804,275 B1* | 8/2014 | Mate | G11B 5/6076 360/75 |
| 8,848,309 B2 | 9/2014 | Budde | |
| 8,970,978 B1* | 3/2015 | Knigge | G11B 5/6076 360/75 |
| 8,995,076 B1* | 3/2015 | Olson | G11B 5/6076 360/69 |
| 9,053,729 B1* | 6/2015 | Kumar | G11B 5/6076 |
| 9,245,561 B1 | 1/2016 | Lee et al. | |
| 2014/0240871 A1 | 8/2014 | Canchi et al. | |
| 2015/0325263 A1* | 11/2015 | Stoebe | G11B 5/60 360/236.5 |

* cited by examiner

HEAD-MEDIUM CONTACT DETECTION USING AN OSCILLATING ELECTROMAGNETIC FORCE

RELATED PATENT DOCUMENTS

This application claims the benefit of Provisional Patent Application Ser. No. 62/232,650 filed on Sep. 25, 2015, to which priority is claimed pursuant to 35 U.S.C. §119(e), and which is incorporated herein by reference in its entirety.

SUMMARY

Embodiments are directed to a method comprising applying an AC signal having a frequency to one of a slider of a recording head and a magnetic recording medium, the AC signal causing an oscillation in an electrostatic force between the slider and the medium at the frequency of the AC signal. The method also comprises causing, by the oscillating electrostatic force, an oscillation in a signal produced by a thermal sensor at the slider, the thermal sensor signal oscillating at the AC signal frequency. The method further comprises detecting one or both of head-medium spacing changes and head-medium contact using a phase of a first harmonic or an amplitude of a second harmonic of the thermal sensor signal.

Other embodiments are directed to an apparatus comprising circuitry configured to apply an AC signal having a frequency to one of a slider of a recording head and a magnetic recording medium. The applied AC signal causes an oscillation in an electrostatic force and clearance between the slider and the medium at the frequency of the AC signal. A thermal sensor is configured to generate a sensor signal at the AC signal frequency in response to sensing changes in temperature resulting from the oscillating clearance. A detector is coupled to the circuitry and the thermal sensor. The detector is configured to detect one or both of head-medium spacing changes and head-medium contact using a phase of a first harmonic or an amplitude of a second harmonic of the thermal sensor signal.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A transducer of a magnetic storage device includes components for recording information to and reading information from a magnetic recording medium. The transducer is usually housed within a small ceramic block called a slider. Sliders are aerodynamically designed to fly on a cushion of air that is generated due to rotating magnetic recording disks at high speeds. The slider has an air-bearing surface (ABS) that may include rails and a cavity or depression between the rails. The ABS is that surface of the slider nearest to the disk as the disk is rotating. Air is dragged between the rails and the disk surface causing an increase in pressure that tends to force the head away from the disk. Air is simultaneously rushing past the cavity or depression in the ABS which produces a lower than ambient pressure area at the cavity or depression. The low-pressure area near the cavity counteracts the higher pressure at the rails. These opposing forces equilibrate so the slider flies over the surface of the disk at a particular fly height. The fly height is the distance between the disk surface and the slider's ABS surface. During operation of a disk drive, the distance between the slider and the disk is very small, on the order of several nanometers. The constant demand for increasing hard drive recording density has resulted in a significant decrease in fly height over the years.

Good performance of the disk drive results when a slider is flown as closely to the surface of a disk as possible. Variation in slider fly height represents an increasingly complicated source of problems due to head/media intermittent contact. Intermittent contact induces vibrations that are detrimental to the reading/writing quality and may also eventually result in a recording head crash that causes the loss of data.

One source of variation in the fly height results from the differences in thermal expansion between the ceramic substrate and the transducer during operation of the disk drive. Due to intrinsic properties, the ceramic substrate and the transducer expand at different rates as the slider heats up. Other sources of variation in the fly height that can negatively affect the fly-height of the slider are lubricant-slider interaction, such as lube pickup, and electrostatic force. Triboelectric charging, for example, can result from the buildup of electrical potential between the disk and the slider caused by the rotating disk surface and/or from the buildup of electrical potential in motor bearings. The negative effects of these and other factors can be diminished and/or eliminated by controlling the voltage potential of the slider with respect to the potential of the disk, often referred to as surface charge control (SCC). Controlling the voltage of the slider can reduce slider wear and provide for lower recording head flying heights.

Although lower head/medium clearance provides for improved performance in a disk drive, the degree to which the slider can be lowered is limited due to the existence of a potential electric force between the slider and medium that is governed by Coulomb's law. If, however, the potential electric force at the medium can be measured, head/medium clearance can be lowered safely by adding an equivalent potential of opposite polarity to the slider, creating an attractive force therebetween. Using such an approach, both performance and reliability can be enhanced.

For an accurate write and read operations to occur, it is desirable to have a relatively small distance or spacing between a read/write head and its associated magnetic recording medium. This distance or spacing is known head-medium spacing, which is interchangeable with the term fly height. By reducing the fly height, a read/write head is typically better able to both write and read data to and from a medium. Reducing the fly height also allows for surveying of recording medium topography, such as for detecting asperities and other features of the recording medium surface. Head-medium contact detection and/or head-medium spacing sensing technologies contribute to the performance and reliability of magnetic storage systems. Higher contact detection repeatability enables lower active clearance, and thus higher recording density. Higher contact detection sensitivity reduces wear and improves reliability.

Contact detection may be performed before the slider-medium system begins any type of recording. Contact detection may be performed on a head-by-head basis and can require significant interaction time between head and disk. Today, many systems implement a contact detection scheme which involves determining the heater power necessary to cause thermal expansion of the slider (head) from a passive fly condition to intermittent slider-medium contact. This intermittent contact may cause significant modulation of the slider fly height. The modulation of slider fly height then results in modulation of heat transfer between the head and disk. A thermal proximity sensor, for example a dual ended temperature coefficient of resistance (DETCR) sensor, can easily pick up these relatively large fluctuations in slider-medium heat transfer. The readings from the thermal proximity sensor in combination with the heater power can be used to establish contact detection.

However, newly developed low clearance technology (LCT) head-medium systems have reduced or eliminated fly height modulation due to intermittent slider-medium contact. The reduction/elimination of fly height modulation has beneficially resulted in the reduced wear of the head during contact detect and unintended slider-medium interaction. However, it has also resulted in the reduction of contact detection strength by the sensors, and/or techniques, that rely on the fly height modulation. As such, in response to the contact detect challenges presented by LCT slider-medium systems, a low-frequency AC heater (LFACH) contact detect scheme has been developed. In LFACH, the amplitude of the heater voltage/power follows an oscillation that causes the fly height to follow the same oscillation. A thermal proximity sensor (e.g., DETCR) in the head detects the oscillation and produces an oscillating sensor signal, which when combined with the heater power can be used to determine the contact detect.

LFACH can have its own limitations in that it may be limited to low heater frequencies, such as those under 1 kHz. At higher frequencies, the fly height does not respond to fluctuations in the power dissipated at the heater. One limitation to heater-induced fly modulation is the thermal time constant for heating the portion of the slider that forms a thermal protrusion. This involves the slider reaching a steady "hot" temperature, with a protrusion and reduced clearance, then cooling to a steady state "cold" temperature with reduced protrusion and increased clearance. If the heater voltage is oscillated too quickly, the slider temperature, as well as the resultant protrusion and clearance, do not have time to respond to the oscillating heater signal and contact detect by LFACH fails. It is noted that thermal time constraints for heater-induced expansion/retraction may be ~400-500 μs, in which case heater induced fly modulation can be limited to under about 1 kHz.

The limited LFACH frequency range (<1 kHz) has been found to be problematic because it supports a relatively slow contact detection capability. In contrast, embodiments of the disclosure provide a contact detection capability that is much faster than an LFACH approach. Contact detection according to various embodiments provides faster contact detection requiring a shorter time in which the head is in contact with the disk. This results in reduced wear. According to various embodiments, contact detection is fast enough that contact can be declared in less than one revolution of the disk. As such, variations in the disk shape can now be detected. After variations in the disk shape have been detected, heater power can be appropriately adjusted to account for such variations.

Embodiments of the disclosure are directed to detecting contact between a read/write head (e.g., a slider) and a magnetic recording medium for low- or non-modulation slider-medium-interfaces defined between the head and the medium (e.g., as in LCT slider-medium systems). As was discussed previously, in a low- or non-modulation HDI, the air bearing is relatively stiff. Because the HDI is a low- or non-modulation interface, a temperature signal produced by a thermal contact sensor, for example, is substantially devoid of a varying signal component during head-medium contact. More particularly, the temperature signal is substantially devoid of an AC component during head-medium contact. Although there may be a small RMS component of the temperature signal, any such RMS component is not usable in the context of conventional contact detection schemes that rely on slider-medium modulation. It has also been found that techniques that use modulation in a position error signal to detect head-medium contact are unreliable and cannot be used to declare head-medium contact events at the middle diameter (MD) location due to the small skew angle between the head and spinning recording medium.

Embodiments of the disclosure are directed to detecting contact between a read/write head (e.g., a slider) and a magnetic recording medium, particularly for a low- or non-modulation slider-medium-interface defined between the head and the medium. As was discussed previously, the relatively stiff air bearing of a low- or non-modulation HDI makes it challenging to detect head-medium contact events using conventional techniques. Detecting head-medium contact at middle diameter (MD) locations of a magnetic recording medium is particularly challenging using conventional techniques in a low- or non-modulation HDI system. Embodiments of the disclosure are directed to apparatuses and methods that provide for reliable detection of head-medium contact events for low- or non-modulation HDIs and for contact events occurring at middle diameter locations of a medium in a low- or non-modulation HDI system.

Figure 1:
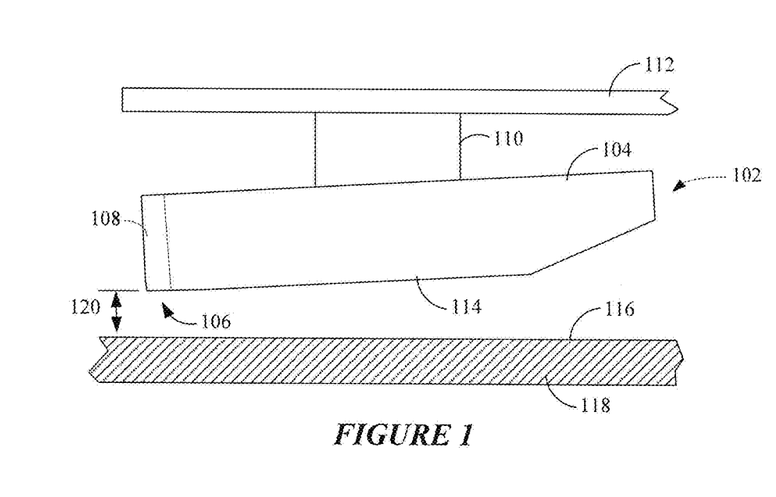
FIGS. 1 and 2 show side views of a slider with which embodiments of the present disclosure can be implemented.
Figure 2:
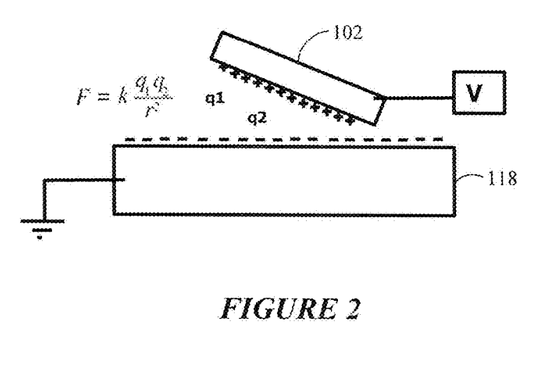

FIG. 1 shows a side view of a slider 102 with which embodiments of the present disclosure can be implemented. The slider 102 includes a slider body 104 and a transducer portion 106 provided within an overcoat region 108 at the trailing edge of the slider 102. The slider 102 is attached via an adhesive 110 to a trace-gimbal assembly (TGA) 112. An air-bearing surface 114 of the slider 102 is shown proximate the surface 116 of a magnetic recording medium 118 (e.g., a disk). The fly height 120 is also indicated. With reference also to FIG. 2, during operation, relative movement between the slider 102 and the medium 118 creates a triboelectric charge (shown as charge q1) on the slider 102 relative to the medium 118 (shown as charge q2). Both contact and near-contact operations accumulate a triboelectric charge on the slider 102 during normal operation and also during take-off and landing.

The slider 102 is subject to a Surface Potential Difference (SPD), also known as Contact Potential Difference and Volta Potential Difference, which is an electrostatic potential difference between two surfaces in close proximity. This occurs for two conductors in electrical contact due to differences in the work function of the material at the surface. Embodiments of the disclosure involve controlling the SPD at a slider-medium interface (HDI), such as that shown in FIGS. 1 and 2. Embodiments of the disclosure involve controllably oscillating the SPD for purposes of detecting changes in slider-medium spacing and slider-medium contact.

Figure 3:
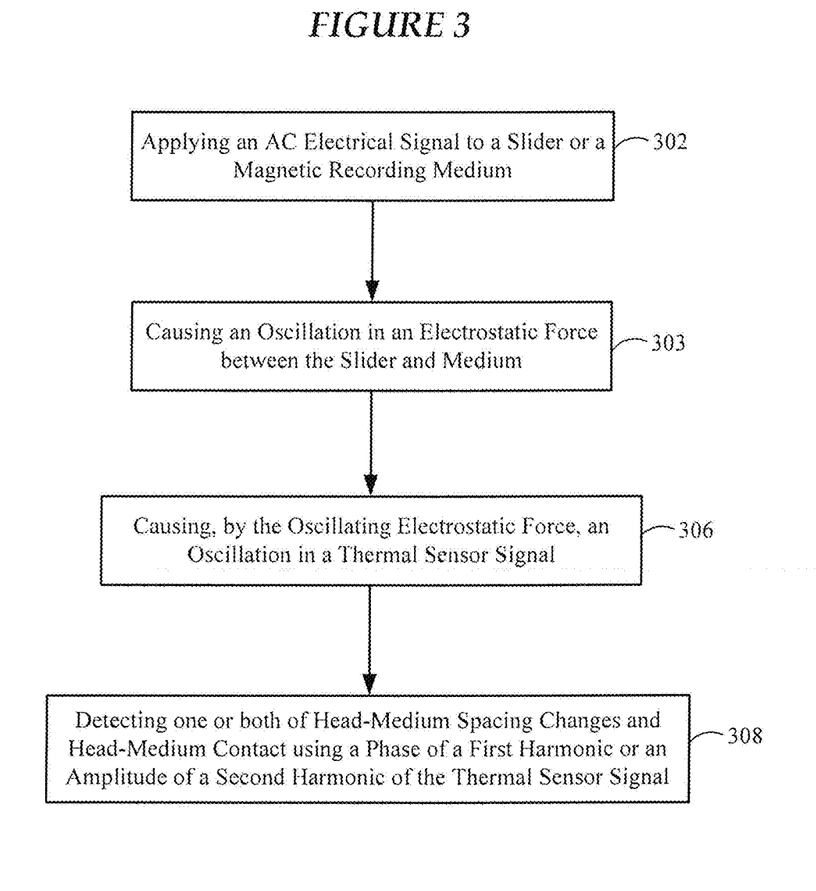
FIG. 3 shows various processes of a method for detecting one or both of head-medium spacing changes and head-medium contact in accordance with various embodiments.

FIG. 3 shows various processes of a method for detecting one or both of head-medium spacing changes and head-medium contact in accordance with various embodiments. The method shown in FIG. 3 involves applying 302 an AC electrical signal to a slider or a magnetic recording medium. The AC electrical signal can be sinusoidal signal or a square wave. The method also involves causing 304 an oscillation in an electrostatic force between the slider and the medium. The method further involves causing 306, by the oscillating electrostatic force, an oscillation in a thermal sensor signal. The method also involves detecting 308 one or both of head-medium spacing changes and head-medium contact using a phase of a first harmonic or an amplitude of the second harmonic of the thermal sensor signal.

Figure 4:
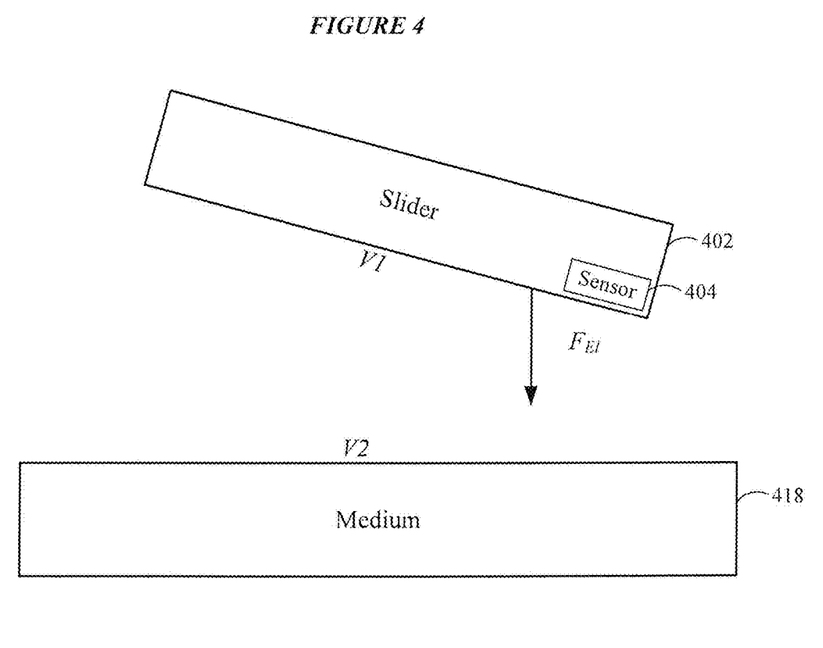
FIG. 4 shows a slider in proximity to the surface of a magnetic recording medium, the slider subject to surface charge control in accordance with various embodiments.

FIG. 4 shows a slider 402 in proximity to the surface of a magnetic recording medium 418. According to various embodiments, a low-modulation (or non-modulation) head-disk interface is defined between the slider 402 and the medium 418. Circuitry can be implemented to apply a non-zero voltage potential to the slider 402 with respect to the potential (e.g., ground or other fixed voltage) of the medium 418. In some embodiments, circuitry can be implemented to apply a non-zero voltage potential to the medium 418 with respect to the potential (e.g., ground or other fixed voltage) of the slider 402. In the embodiment shown in FIG. 4, an AC signal, V1, is applied to the slider 402, where V1 can be represented as a voltage defined by $V_{DC}+V_{AC}\sin(\omega t)$, where $V_{DC}$ is the DC bias voltage component of V1 and $V_{AC}\sin(\omega t)$ is the AC voltage component of V1. A voltage, V2, is applied to the medium 418, where V to can be represented as a fixed voltage, which may be ground.

In this illustrative embodiment, the AC signal, V1, represents an SCC signal that applies a bias voltage to the slider 402, effectively changing the electrostatic potential difference between the slider 402 and the medium 418. The square of the potential difference is proportional to the electrostatic force between the slider 402 and the medium 418. The electrostatic force between the slider 402 and the medium 418 contributes to the equilibrium flying height of the slider 402. Thus, as the SCC signal (V1) is changed, the fly height of the slider 402 is also changed. The fly height change of the slider 402 is large enough that a thermal signal is detectable by a sensor 404 situated on the slider 402.

Consider the scenario where the SCC signal (V1) is applied to the slider 402 and a signal is measured that depends on the electrostatic force between the slider 402 and the medium 418. This electrostatic force. $F_{EL}$, can be represented by the following expression:

$$F_{EL} = -\frac{1}{2}\left(\frac{dC}{dz}\right)V^2$$

where C is the capacitance between the head and medium, z is the head medium spacing, and V is the voltage difference between head and medium. This electrostatic force, $F_{EL}$, has components at first and second harmonics of the SCC signal frequency. The force component, Fω, associated with the first harmonic of the SCC signal frequency can be represented by the following expression:

$$F_\omega = -\left(\frac{dC}{dz}\right)(\phi - V_{DC})V_{AC}\sin(\omega t)$$

where $\phi$ is the SPD at the slider-medium interface, $V_{DC}$ is the DC bias voltage component of V1, $V_{AC}$ is the AC voltage component of V1, and ω is the frequency of the SCC signal. The force component, $F_{2\omega}$, associated with the second harmonic of the SCC signal frequency can be represented by the following expression:

$$F_{2\omega} = \frac{1}{4}\left(\frac{dC}{dz}\right)V_{AC}^2\cos(2\omega t).$$

The response of the sensor signal at the first harmonic of the SCC driving frequency can be calculated by a software lock-in algorithm implemented by a processor of the drive electronics (e.g., a detector). A memory coupled to the processor can be configured to store sensor voltage versus time data. The software lock-in at a given frequency can be calculated by taking the dot product of the voltage data with a sine wave and cosine wave at the specified frequency. A sum of the dot product with the sine and cosine functions, normalized by the number of samples in the sensor voltage data, gives the amplitude of the sensor response at the specified frequency. The phase of the sensor signal at the specified frequency is given by the arctangent of the ratio of the dot product of the sensor signal with the sine and cosine functions. This software lock-in technique relies on the orthoganality property of the sine function. A sine function at a specified frequency is orthogonal to a sine function at all other frequencies. Thus, by taking the dot product of the sensor data with a sine function at the input frequency, the portion of the signal at the input frequency can be isolated. The software lock-in technique described herein is similar to taking the cross-correlation of the sensor signal with a sine function at the specified frequency.

The sensor signal at the first harmonic of the SCC driving frequency responds to thermal fluctuations in the slider 402. The slider temperature oscillates at the SCC driving frequency because heat transfer from slider 402 to the medium 418 changes with head-medium spacing; and that spacing is determined by the electrostatic force between slider 402 and medium 418, which is set by the electric potential difference between slider 402 and medium 418. To reiterate, SCC voltage sets slider-medium force, which sets slider-medium spacing, which sets slider-medium heat transfer, which sets slider temperature, which sets sensor resistance, which sets the measured voltage of the sensor 404. The magnitude of the force at the first harmonic is proportional to (1) the DC slider-medium SPD; and (2) the peak-to-peak AC SCC voltage. Thus, it is expected that the sensor voltage signal at the first harmonic is also proportional to (1) the DC slider-medium SPD; and (2) the peak-to-peak AC SCC voltage.

The lock-in amplitude of the sensor signal at the SCC driving frequency can be interpreted as a measurement of the derivative of sensor resistance with respect to SCC voltage, dR/dV. As described above, a change in SCC voltage causes an effect in sensor resistance only through a chain of intermediary variables (fly height (FH), heat transfer, etc.). To proceed with this discussion, it will be assumed that the changes in SCC voltage cause small, linear changes in the intermediary variables. In particular, it is assumed that dV is proportional to dFH.

A Power-to-Contact (PtC) curve can be generated by collecting heater power and slider fly height data while progressively increasing the power applied to the heating element (heater) of the slider 402. As heater power increases, the close point of the slider 402 moves closer to the disk, ultimately coming in contact with the disk. The measured dR/dV signal changes in a predicable way as the close point of the slider 402 moves closer to the medium 418. When the slider 402 is relatively far from the medium 418, small changes in fly height do not significantly change sensor resistance, R, and dR/dV is near zero. When the close point of the slider 402 is in close proximity to the medium 418, the same small change in fly height results in a much larger change in sensor resistance, R. This occurs because the heat transfer coefficient between slider 402 and medium 418 is highly sensitive to fly height. As the close point of the slider 402 achieves contact with the medium 418, the sensor signal begins to respond to the frictional heating caused by contact. A maximum in the dR/dV signal is observed when the fly height of the close point is modulated between two very different thermal conditions: (1) head-medium contact; and (2) small fly height, but out of contact. The maximum in the dR/dV signal can be used to declare head-medium contact.

The AC SCC contact detection method disclosed herein is similar in some respects to the aforementioned contact detection method known as Low Frequency AC Heater. LFACH modulates fly height by adjusting heater power at a specified frequency. The measured lock-in amplitude of the sensor response, known as dR/dP for the LFACH approach, is used as a contact signal. During generation of a PtC, the LFACH contact detection signal behaves similarly to the AC SCC signal; however, LFACH has two important disadvantages; the contact detection response time, and the second concerns thermal noise. First, fly height modulation by heater power is limited by the response time of head thermal expansion. Typically, the maximum LFACH rate is 1 kHz. Fly height modulation by AC SCC is known to be much faster. For example, the fly height response using an AC SCC approach has been measured at 300 kHz, and the upper bound of the response time is unknown. Second, the thermal sensor resistance measurement is sensitive to head thermal fluctuations from both spacing and heater power. During LFACH, the modulating heater power changes the steady-state head temperature independently of any thermal expansion based fly height change. This acts a noise source, polluting the thermal fluctuations due to head disk spacing. An AC SCC contact detection approach is advantageous because it allows for fly height modulation without changing the heater power.

The thermal sensor signal is a measurement of the voltage across the sensor 404. It has been found that this voltage signal is susceptible to electrical crosstalk noise. Such electrical noise can make it difficult or impractical to use the first harmonic response of the sensor 404 for detecting contact events and/or head-medium spacing using conventional techniques.

In some embodiments, the SCC signal is driven through the TGA traces (see TGA 112 shown in FIG. 1) into the substrate 403 of the slider 402. In such embodiments, the sensor 404 is configured to sense head-medium spacing and/or head-medium contact, but is not configured to communicate the SCC signal to the slider substrate 403. Possible noise pathways include capacitive coupling in the TGA traces and capacitive coupling in the transducer.

In other embodiments, the sensor 404 is configured to communicate the SCC signal to the slider substrate 403 in addition to sensing head-medium spacing and/or head-medium contact. In such embodiments, electrical noise is especially concerning at the SCC driving frequency. Noise and other complications result from using the same circuit conductors and components for both driving the SCC signal to the slider body and reading a response of a sensor of the circuitry to detect head-medium contact/spacing.

Figure 5:
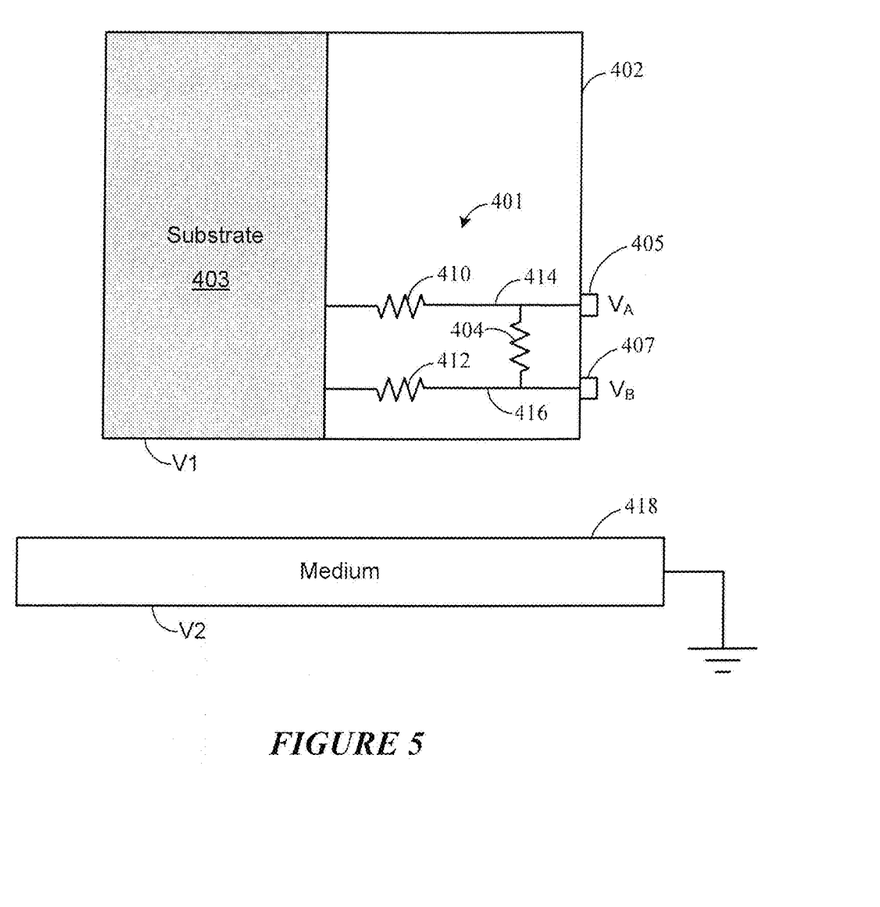
FIG. 5 illustrates circuitry configured to cause an oscillation of the surface potential of a slider in addition to detecting one or both of head-medium spacing changes and head-medium contact in accordance with various embodiments.

Referring now to FIG. 5, the circuitry 401 is configured to set the voltage potential of the substrate 403 and cause an oscillation of the surface potential of the substrate 403, in addition to detecting one or both of head-medium spacing changes and head-medium contact in accordance with various embodiments. In this regard, the circuitry 401 is configured to operate in multiple modes; a contact detection mode (which includes fly height detection) and an SCC mode. In the contact detection mode, the circuitry 401 is configured to sense signals indicative of temperature and temperature changes across the sensor 404. In the SCC mode, the circuitry 401 is configured to drive an AC signal for purposes of controlling and oscillating the surface potential of the slider 402. According to various embodiments, a low-modulation (or non-modulation) head-disk interface is defined between the slider 402 and the medium 418.

The circuitry 401 includes a first conductor 414 that extends from a first electrical bond pad 405 to a first resistor 410. The first resistor 410 is connected to a substrate 403 (e.g., AlTiC) of the slider 402. A second conductor 416 extends from a second electrical bond pad 407 to a second resistor 412. The second resistor 412 is connected to the substrate 403. A sensor 404 is coupled between the first and second conductors 414, 416. In the embodiment shown in FIG. 5, the sensor 404 is implemented as a resistance temperature sensor, such as a DETCR. Other types of thermal sensors can be employed, such as a varistor or a thermocouple, for example. The sensor 404 is biased relative to a common mode voltage at the first and second bond pads 405, 407. The sensor 404 produces a signal indicative of temperature. The signal produced by the sensor 404 and sensed at the first and second bond pads 405, 407 can be used to detect a change in head-medium spacing and/or head-medium contact. It is noted that electrical noise is introduced by bond pad sharing between the circuitry 401 and the sensor 404, the noise falling within a frequency range that includes a first harmonic of the sensor signal.

According to some embodiments, the voltage, $V_A$, applied to bond pad 405 is a positive voltage and the voltage, $V_B$, applied to bond pad 407 is a positive voltage. In response to application of the voltages the $V_A$ and $V_B$ to bond pads 405 and 407, the voltage potential of the slider 402, V1, is given by $V1=((V_A+V_B)/2+\text{Intrinsic Tribocharge})$. The voltage V2 of the medium 418 can be zero or other fixed voltage. During a contact detection mode, the voltage, $V_A$, applied to bond pad 405 is a positive voltage, and the voltage, $V_B$, applied to bond pad 407 is a negative voltage. As such, the sensor bias voltage during contact detection (and fly height spacing measuring) is given by $V_A-V_B$.

Figure 6A:
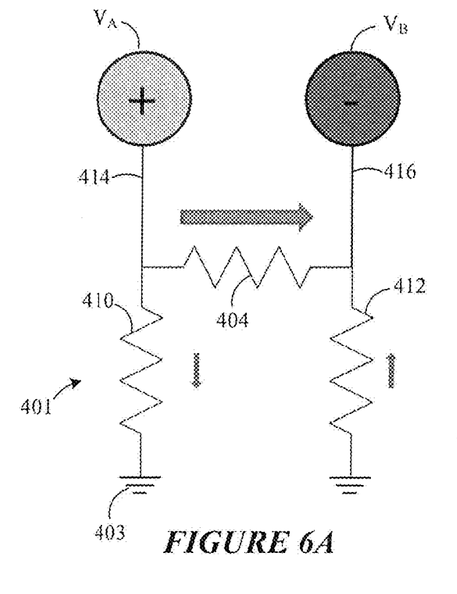
FIG. 6A shows the circuitry shown in FIG. 5 in a contact detection mode in accordance with various embodiments.
Figure 6B:
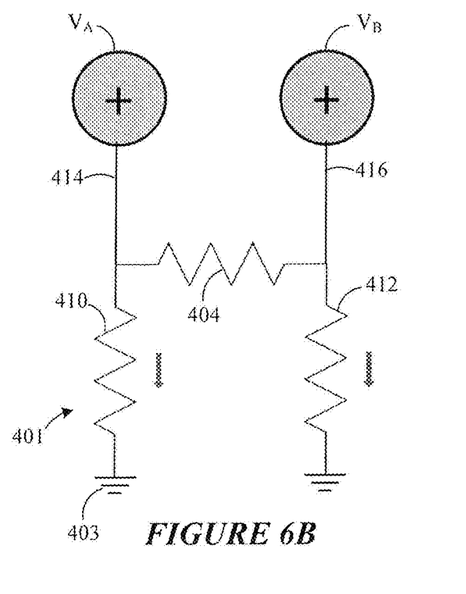
FIG. 6B shows the circuitry shown in FIG. 5 in a surface charge control mode in accordance with various embodiments.

FIGS. 6A and 6B illustrate the circuitry 401 shown in FIG. 5 in a contact detection mode (FIG. 6A) and a SCC mode (FIG. 6B), respectively. It is noted that the ground symbols shown in FIGS. 6A and 6B represent the substrate 403 of the slider 402 shown in FIG. 5. It is also noted that resistors 410 and 412 can be 10 kΩ resistors, for example. In FIG. 6A, voltage $V_A$ is positive in voltage and $V_B$ is negative, thereby biasing the sensor 404 for operation in a contact detection mode. Current flow through the circuitry 401 is shown by directional arrows across each of the resistors 404, 410, and 412.

In FIG. 6B, and with reference once again to FIG. 5, a common mode AC voltage signal (e.g., $V_{DC}+V_{AC}\sin(\omega t)$) is applied to the sensor 404 (both $V_A$ and $V_B$ positive) to charge the substrate 403 of the slider 402. Application of the common mode AC voltage signal to the sensor 404 causes mechanical oscillation of the slider 402 relative to the medium 418 due to oscillation of the electrostatic force between the slider 402 and the medium 418. The frequency of mechanical oscillation of the slider 402 is the fundamental (first harmonic) frequency of the AC voltage signal. In addition to driving mechanical oscillation of the slider, the common mode AC voltage signal can be applied to the circuitry 401 to bias the sensor 404. This can be achieved by making $V_A$ and $V_B$ positive, and $V_A>V_B$.

Figure 7:
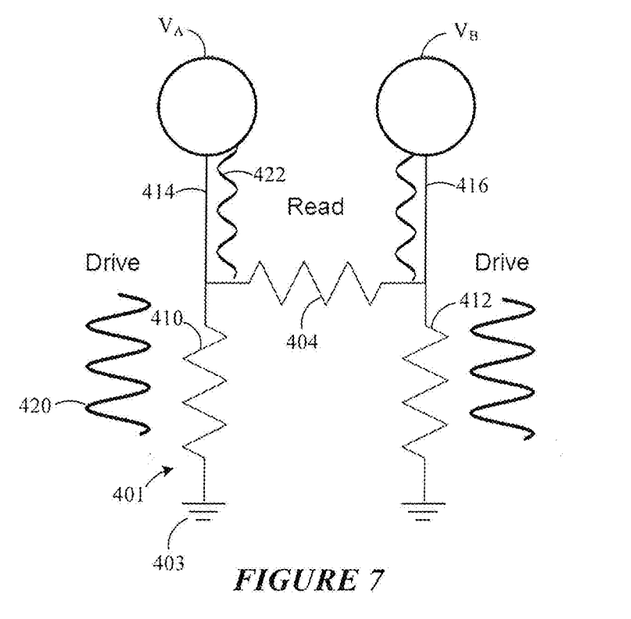
FIG. 7 shows the circuitry shown in FIG. 5 being used to apply an SCC signal to a slider and read a sensor signal back across the same conductors as the drive signal is present in accordance with various embodiments.

As is best shown in FIG. 7, the circuitry 401 is used to both apply the SCC signal to the slider 402 and read a sensor signal back across the same conductors (414 and 416) as the drive signal is present, since the circuitry 401 concurrently drives SCC and measures head-medium spacing/contact. In FIG. 7, $V_A$ and $V_B$ are positive, and $V_A>V_B$. As was discussed previously, electrical noise in a frequency range that includes the fundamental frequency of the AC voltage signal (SCC signal) applied to the sensor 404 makes it challenging to read the sensor signal for contact detection and spacing determinations. It is been determined that this electrical noise is not a concern in the second harmonic response of the sensor 404 to the SCC signal.

As is depicted in FIG. 7, the fundamental tone or first harmonic 420 of the SCC signal is used to drive oscillation of the electrostatic force between the slider 402 and the medium 418. Although the second harmonic response 422 has an amplitude significantly smaller than that of the first harmonic 420, this response can be readily detected by locking onto the second harmonic of sensor response 422. According to some embodiments, the second harmonic response of the sensor 404 can be used to perform head-medium spacing and contact detection determinations in response to an AC SCC signal applied to the slider 402. Because the second harmonic response of the sensor 404 falls within a frequency range well above that associated with the above-described electrical noise, this response of a sensor 404 can be used to reliably detect contact events and changes in slider fly height.

The second harmonic response of the sensor 404 to the SCC signal can be calculated by a software lock-in technique similar to that described hereinabove with respect to the first harmonic response. Because the electrostatic force scales with the square of the slider-medium voltage difference, the force has a component at the second harmonic of the SCC driving frequency. The magnitude of the electrostatic force between the slider 402 and medium 418 is proportional to the square of the peak-to-peak AC SCC voltage. The electrostatic force at the second harmonic of the SCC driving frequency causes a second harmonic sensor response. The mechanism for the signal response of the sensor 404 is the essentially the same for the first and second harmonic. A second harmonic response of the sensor 404 occurs due to the voltage-force relation.

Figure 8:
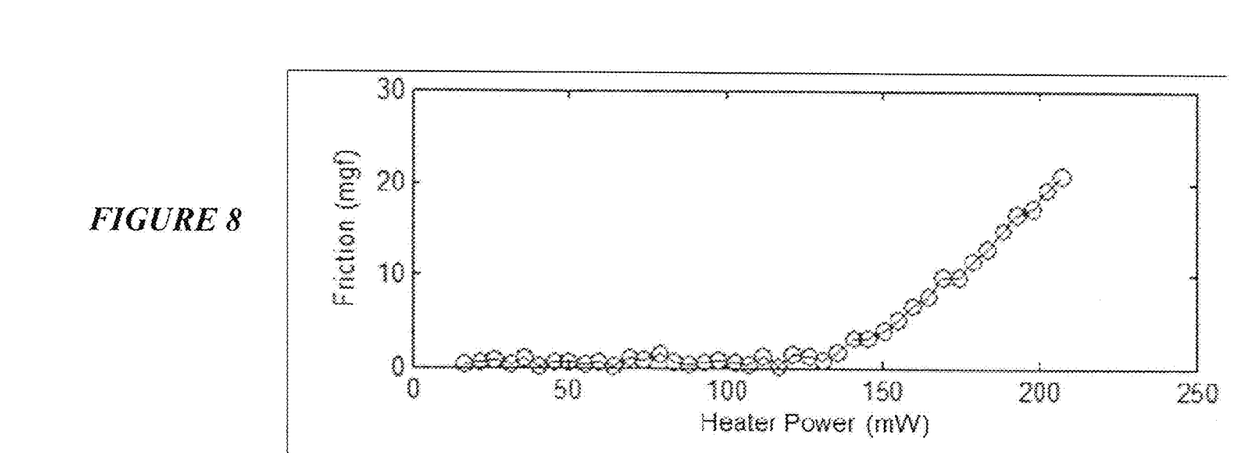
FIGS. 8 and 9 demonstrate the efficacy of using the second harmonic response of a sensor situated on a slider for contact detection according to various embodiments.
Figure 9:
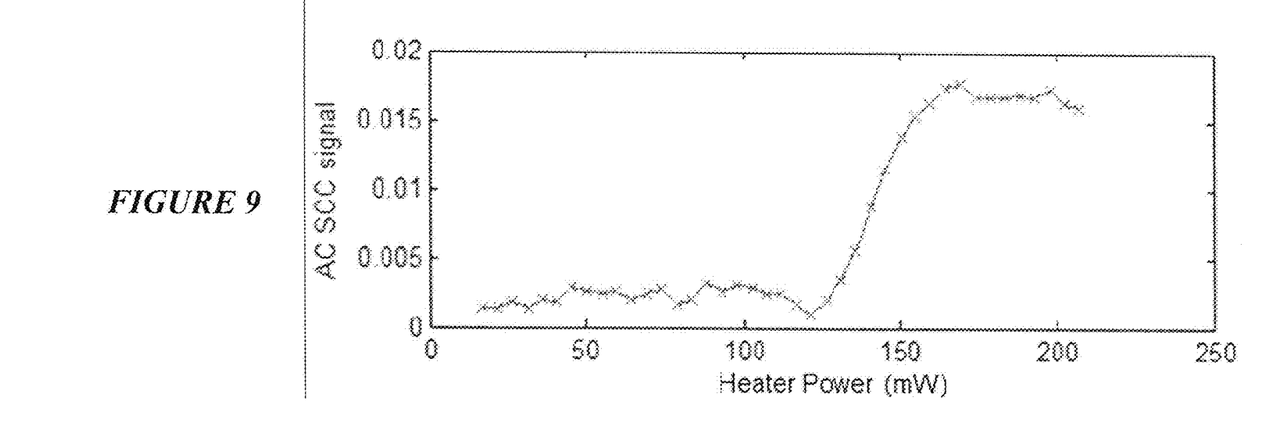

FIGS. 8 and 9 demonstrate the efficacy of using the second harmonic response of the sensor 404 for contact detection according to various embodiments. FIGS. 8 and 9 show a contact detection response as power supplied to a heater of a slider is gradually increased to reduce clearance and ultimately cause head-medium contact. FIG. 8 shows a friction sensor response indicating onset of head-medium contact at ~150 mW for this condition. The second harmonic of the response of the sensor 404 to an AC SCC driving frequency is shown in FIG. 9. The data of FIG. 9 shows a clear increase in the sensor's second harmonic response at the moment of head-medium contact.

According to other embodiments, a change in the phase delay in the first harmonic sensor response can be used to detect a head-medium contact event. Using the phase delay in the first harmonic sensor response as a head-medium contact detection metric avoids the aforementioned problems associated with electrical noise. As was discussed above, the software lock-in at a given frequency can be calculated by taking the dot product of the voltage data with a sine wave and cosine wave at the specified frequency. The phase of the sensor signal at the specified frequency is given by the arctangent of the ratio of the dot product of the sensor signal with the sine and cosine functions. Accordingly, the software lock-in technique disclosed hereinabove gives a phase angle for the sensor response to the first harmonic of the SCC driving frequency. A phase delay with respect to the phase of the SCC input signal is calculated. Because the magnitude of this phase delay is expected to vary based on the measurement electronics, only a change in phase delay relative to the phase delay at passive fly height need be detected as an indicator of head-medium contact. The measured phase delay changes as a function of fly height during the PtC sweep.

Figure 10:
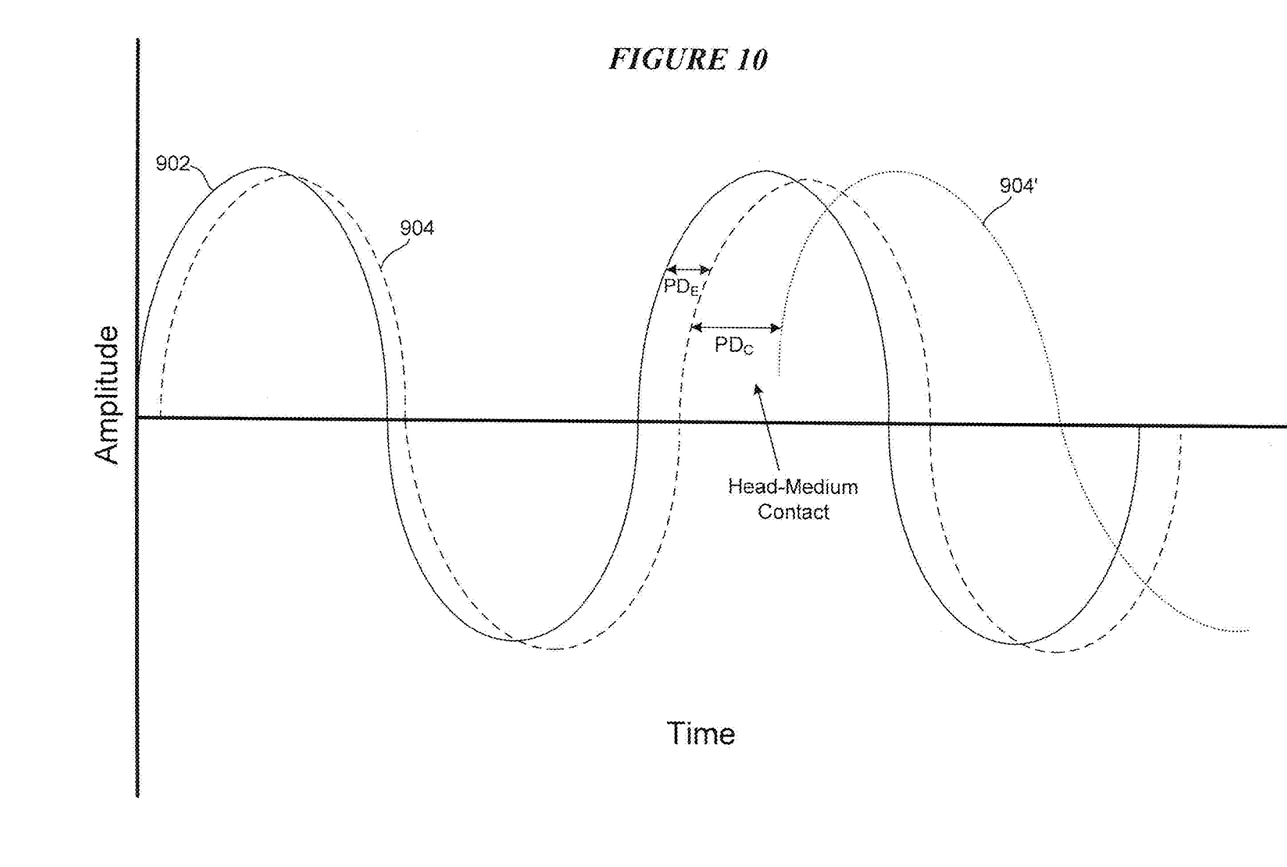
FIG. 10 is a graphical representation of head-medium contact detection that uses a change in the phase delay in the first harmonic sensor response in accordance with various embodiments.

FIG. 10 is a graphical representation of head-medium contact detection that uses a change in the phase delay in the first harmonic sensor response in accordance with various embodiments. In FIG. 10, the phase of the SCC drive signal is shown as curve 902. The expected phase delay, $PD_E$, due to the measurement electronics is shown as curve 904. Curve 904 shows that the expected phase delay varies as a function of slider fly height. Curve 904' shows an appreciable change ($PD_C$) in the expected phase delay 904 due to a head-medium contact event. A change 904' in the expected phase delay 904 above a predetermined threshold can be detected as a head-medium contact. The predetermined threshold may be a percentage change, a fixed change, or a specified deviation from the expected phase delay 904.

Figure 11:
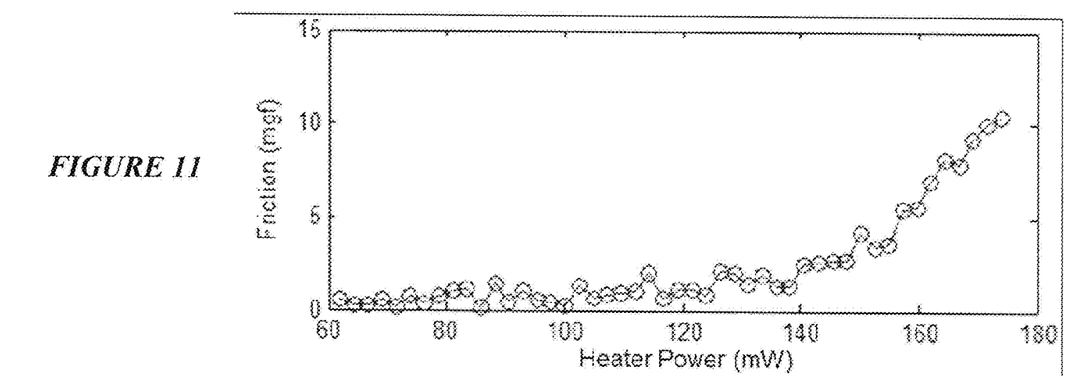
FIGS. 11 and 12 demonstrate the efficacy of using a change in expected phase delay in the first harmonic response of a sensor situated on a slider for contact detection according to various embodiments.
Figure 12:
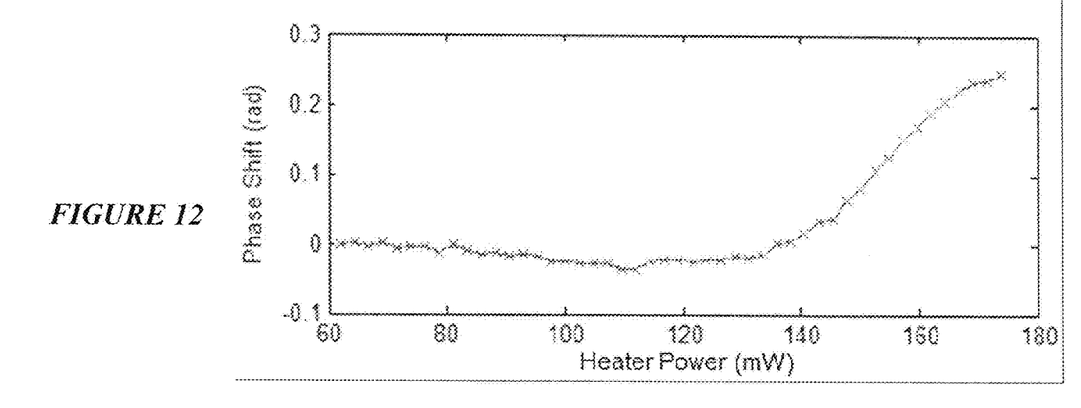

FIGS. 11 and 12 demonstrate the efficacy of using a change in expected phase delay in the first harmonic response of the sensor 404 for contact detection according to various embodiments. FIGS. 11 and 12 show a contact detection response as power supplied to a heater of a slider is gradually increased to reduce clearance and ultimately cause head-medium contact. FIG. 11 shows a friction sensor response indicating onset of head-medium contact at ~150 mW for this condition. The phase shift of the first harmonic of the sensor response to the AC SCC driving frequency is shown in FIG. 12. The data of FIG. 12 shows a clear increase in the phase delay signal occurs during head-medium contact.

Figure 13:
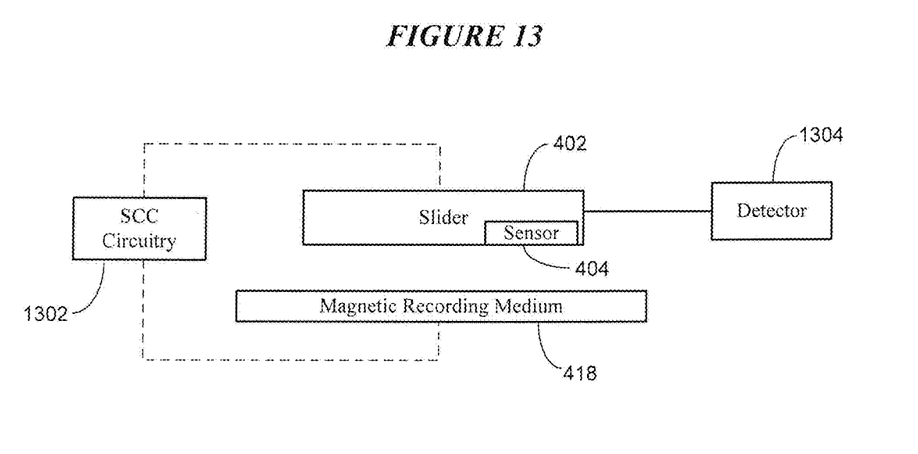
FIG. 13 is a block diagram of a system for detecting one or both of head-medium spacing changes in head-medium contact in accordance with various embodiments.
Figure 14:
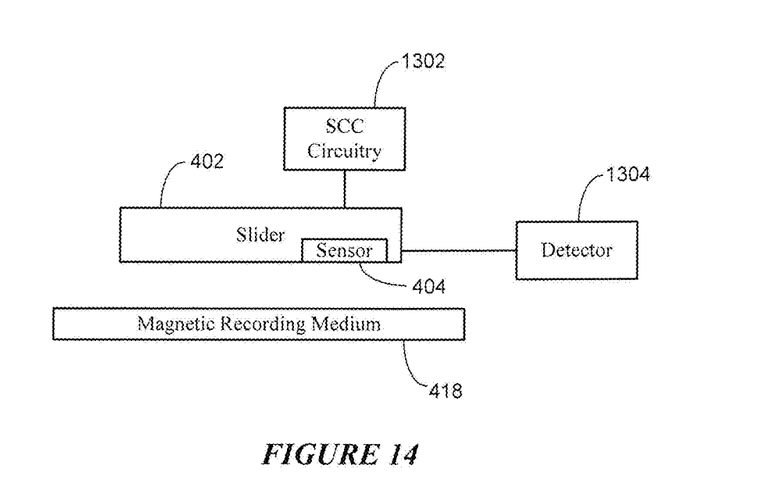
FIG. 14 is a block diagram of a specific configuration of the system shown in FIG. 13 in accordance with various embodiments.

FIG. 13 is a block diagram of a system for detecting one or both of head-medium spacing changes in head-medium contact in accordance with various embodiments. FIG. 14 is a block diagram of a specific configuration of the system shown in FIG. 13. The systems shown in FIGS. 13 and 14 include a slider 402 in proximity to a magnetic recording medium 418. A sensor 404, such as a thermal sensor, is provided on the slider 402, preferably at or near an air bearing surface of the slider 402. SCC circuitry 1302 is shown coupled to one of the slider 402 and the magnetic recording medium 418 in FIG. 13. In FIG. 14, the SCC circuitry 1302 is coupled to the slider 402. It is noted that, according to various embodiments, a low-modulation (or non-modulation) head-disk interface is defined between the slider 402 and the medium 418.

The SCC circuitry 1302 is configured to set a non-zero bias voltage on the either the slider body 402 or the magnetic recording medium 418, depending on the SCC configuration. The SCC circuitry 1302 is configured to change the voltage difference between the slider 402 and the medium 418, which causes a change in the fly height between the slider 402 and the medium 418. In some embodiments, the SCC circuitry 1302 is configured to controllably change the fly height between the slider 402 and the medium 418 by approximately 2-4 Ang/V, which is air bearing dependent. The sensor 404 is preferably sensitive to fly height changes of this magnitude. As such, the signal produced by the sensor 404 can be used to determine head-medium proximity and head-medium contact according to the techniques disclosed hereinabove.

According to various embodiments, the SCC circuitry 1302 is configured to apply an AC signal having a specified frequency to one of the slider 1302 and the medium 418. In some embodiments, the frequency of the AC signal applied by the SCC circuitry 1302 is based on a servo sampling rate such as 33 kHz or 70 kHz for example. The AC signal can have a frequency that is a sub-harmonic of a servo sampling rate. It is understood that the servo sampling rate varies based on the particular disk drive design, and that a wide variety of sampling rates are contemplated (e.g., 6 kHz, 19 kHz). In other embodiments, the AC signal is not limited to servo sampling rates, but can be any frequency between about 90 Hz to about 400 kHz, for example. In disk drive applications, generating an AC signal having a frequency unrelated to the servo sampling rate would generally require the preamplifier coupled to the SCC circuitry 1302 to be configured to generate the desired AC signal frequency.

A detector 1304 is shown coupled to the slider 402. More particularly, the detector 1304 is coupled to the sensor 404 and, in some embodiments, is also coupled to the SCC circuitry 1302. The detector 1304 is configured to detect one or both of head-medium spacing changes and head-medium contact using a phase of a first harmonic or an amplitude of the second harmonic of the signal produced by the sensor 404. The detector 1304 may include a processor and memory configured to implement the various software lock-in methodologies discussed hereinabove.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
applying an AC signal having a frequency to one of a slider of a recording head and a magnetic recording medium, the AC signal causing an oscillation in an electrostatic force between the slider and the medium at the frequency of the AC signal;
causing, by the oscillating electrostatic force, an oscillation in a signal produced by a thermal sensor at the slider, the thermal sensor signal oscillating at the AC signal frequency; and
detecting one or both of head-medium spacing changes and head-medium contact using a change in a phase delay between a phase of a first harmonic of the thermal sensor signal and a phase of the applied AC signal.

2. The method of claim 1, wherein the AC signal is a sinusoidal waveform or a square waveform.

3. The method of claim 1, wherein the frequency of the AC signal is defined in relation to a servo sampling rate.

4. The method of claim 1, wherein the frequency of the AC signal is between 90 Hz and 400 kHz.

5. The method of claim 1, wherein:
electrical noise is introduced in the recording head in a frequency range that includes a first harmonic of the thermal sensor signal; and
detecting using the amplitude of the second harmonic avoids the noise.

6. The method of claim 1, wherein:
applying comprises applying the AC signal using a circuit that includes the thermal sensor; and
detecting comprises detecting one or both of head-medium spacing changes and head-medium contact using the circuit.

7. An apparatus, comprising:
circuitry configured to apply an AC signal having a frequency to one of a slider of a recording head and a magnetic recording medium, the applied AC signal causing an oscillation in an electrostatic force and clearance between the slider and the medium at the frequency of the AC signal;
a thermal sensor configured to generate a sensor signal at the AC signal frequency in response to sensing changes in temperature resulting from the oscillating clearance; and
a detector coupled to the circuitry and the thermal sensor, the detector configured to detect one or both of head-medium spacing changes and head-medium contact using a change in a phase delay between a phase of a first harmonic of the thermal sensor signal and a phase of the applied AC signal.

8. The apparatus of claim 7, wherein the circuitry comprises the thermal sensor.

9. The apparatus of claim 8, wherein:
electrical noise is introduced by bond pad sharing between the circuitry and the thermal sensor, the noise falling within a frequency range that includes a first harmonic of the thermal sensor signal; and
detecting one or both of head-medium spacing changes and head-medium contact by the detector avoids the noise.

10. The apparatus of claim 7, wherein the thermal sensor is separate from the circuitry that applies the AC signal to one of the slider and the medium.

11. The apparatus of claim 10, wherein:
the slider comprises a plurality of electrical bond pads;
the circuitry is coupled to at least a pair of the bond pads; and
the thermal sensor shares at least one bond pad with the circuitry.

12. The apparatus of claim 7, wherein the AC signal is a sinusoidal waveform or a square waveform.

13. The apparatus of claim 7, wherein the frequency of the AC signal is defined in relation to a servo sampling rate.

14. The apparatus of claim 7, wherein the frequency AC signal is between 90 Hz and 400 kHz.

15. The apparatus of claim 7, wherein the thermal sensor comprises a dual-ended temperature coefficient of resistance (DETCR) sensor.

16. A method, comprising:
applying an AC signal having a frequency to one of a slider of a recording head and a magnetic recording medium, the AC signal causing an oscillation in an electrostatic force between the slider and the medium at the frequency of the AC signal;
causing, by the oscillating electrostatic force, an oscillation in a signal produced by a thermal sensor at the slider, the thermal sensor signal oscillating at the AC signal frequency; and
detecting one or both of head-medium spacing changes and head-medium contact using a phase of a first harmonic or an amplitude of a second harmonic of the thermal sensor signal;
wherein:
electrical noise is introduced in the recording head in a frequency range that includes a first harmonic of the thermal sensor signal; and
detecting using the amplitude of the second harmonic avoids the noise.

17. An apparatus, comprising:
circuitry configured to apply an AC signal having a frequency to one of a slider of a recording head and a magnetic recording medium, the applied AC signal causing an oscillation in an electrostatic force and clearance between the slider and the medium at the frequency of the AC signal;
a thermal sensor configured to generate a sensor signal at the AC signal frequency in response to sensing changes in temperature resulting from the oscillating clearance, the circuitry comprising the thermal sensor; and
a detector coupled to the circuitry and the thermal sensor, the detector configured to detect one or both of head-medium spacing changes and head-medium contact using a phase of a first harmonic or an amplitude of a second harmonic of the thermal sensor signal;
wherein:
electrical noise is introduced by bond pad sharing between the circuitry and the thermal sensor, the noise falling within a frequency range that includes a first harmonic of the thermal sensor signal; and
detecting one or both of head-medium spacing changes and head-medium contact by the detector avoids the noise.

* * * * *